United States Patent
Phillips

(10) Patent No.: US 7,430,426 B2
(45) Date of Patent: Sep. 30, 2008

(54) APPARATUS, AND ASSOCIATED METHOD, FOR SELECTABLY DELAYING SYNCHRONIZATION OF DATABASE COPIES IN A RADIO COMMUNICATION SYSTEM

(75) Inventor: Catherine Phillips, Waterloo (CA)

(73) Assignee: Research in Motion Limited, Waterloo (CA)

( * ) Notice: Subject to any disclaimer, the term of this patent is extended or adjusted under 35 U.S.C. 154(b) by 655 days.

(21) Appl. No.: 11/041,465

(22) Filed: Jan. 24, 2005

(65) Prior Publication Data

US 2006/0166689 A1 Jul. 27, 2006

(51) Int. Cl.
*H04Q 7/20* (2006.01)
(52) U.S. Cl. .................. 455/502; 455/501; 455/500; 455/412.1; 455/412.2; 455/422.1; 370/345; 370/343
(58) Field of Classification Search ............ 455/3.04, 455/556.2, 550.1, 502, 501, 500, 412.1, 412.2, 455/422.1, 403, 405, 69, 67.11, 566, 426.1, 455/426.2; 707/10, 201; 709/206, 248, 219, 709/221; 340/3.2, 3.21, 3.71, 3.7, 3.1; 70/268; 324/327; 99/327; 700/17, 83, 15; 715/844; 370/350.345, 343, 503, 480
See application file for complete search history.

(56) References Cited

U.S. PATENT DOCUMENTS 5,592,626 A 1/1997 Papadimitriou et al.
6,034,621 A * 3/2000 Kaufman ............... 340/7.21
6,052,735 A 4/2000 Ulrich et al.
6,477,374 B1 * 11/2002 Shaffer et al. ............ 455/445
6,535,892 B1 3/2003 LaRue et al.
6,810,405 B1 * 10/2004 LaRue et al. .............. 707/201

FOREIGN PATENT DOCUMENTS

EP 0917077 5/1999

OTHER PUBLICATIONS

Prabhakaran, Vanitha. "How to Congifure Always Up-to-Date Notifications," Dec. 1, 2004, Microsoft TechNet Online.*
Mattox, Steve. "What is the Exchange ActiveSync Up-to-date feature and how does it work?" Apr. 26, 2004, The Microsoft Exchange Team Blog.*
"Toshiba Pocket PC e800/e805 User's Guide," Sep. 2003, Toshiba Corporation, pp. 64 and 65.*

* cited by examiner

*Primary Examiner*—Keith T Ferguson

(57) ABSTRACT

Apparatus, and an associated method, for selectably delaying performance of synchronization operations in which database copies are placed in match with one another. A user of a mobile node at which a database copy is maintained selectably actuates an actuator to select delay of performance of the synchronization operations. Once selection is made to delay the performance of the synchronization operations, selection is further made by a delay selector of the delay period prior to which synchronization operations are carried out.

18 Claims, 4 Drawing Sheets

APPARATUS, AND ASSOCIATED METHOD, FOR SELECTABLY DELAYING SYNCHRONIZATION OF DATABASE COPIES IN A RADIO COMMUNICATION SYSTEM

The present invention relates generally to a manner by which to perform data synchronization operations to synchronize database copies maintained at separate parts of a radio communication system. More particularly, the present invention relates to apparatus, and an associated method, by which selectably to control when synchronization operations are performed.

A user of a mobile node at which a database copy is maintained selectably delays performance of the synchronization operations for a selected delay period. And, when selection is made to delay the performance of the synchronization operations, a delay period defining the length of the delay is selected. The delay is selected by the user, e.g., when the user is to use the mobile node for another purpose, i.e., to perform another application. Commencement of the synchronization operations is delayed to reduce the possibility that concurrent performance of the synchronization operations and the other applications slows down, or otherwise interferes with operation of, the other application. And through appropriate selection of the delay period, the synchronization operations are caused to be carried out during periods of lessened usage of the radio communication system.

BACKGROUND OF THE INVENTION

The availability of communication systems is a practical necessity for many aspects of modem society. Data is communicated during operation of a communication system, and such communication of the data effectuates data communication services. Some communication systems are constructed in manners that permit the communication of data, and corresponding effectuation of communication services, over significant distances. Attempts are generally made to maximize the rate at which the data is communicated in the communication system and also to maximize the accuracy of the data that is communicated. As rate of data communication and accuracy of its communication sometimes conflict, a balance is sometimes attempted to be achieved during operation of a communication system.

A communication system is formed of, at a minimum, a set of communication stations that are interconnected by way of a communication channel. At least one of the communication stations of the set forms a sending station. And, another of the communication stations of the set forms a receiving station. And, a communication service is effectuated through the communication of data from a sending station to a receiving station. Communication stations of various communication systems provide for two-way communications in which the communication stations include both transmit and receive portions, capable of transmitting and receiving, respectively, data.

As advancements in technologies permit, improvements to existing communication systems are implemented, and new types of communication systems are developed and deployed. Various of the technological advancements, when implemented, have permitted the effectuation of new types of communication services.

A radio communication system is an exemplary type of communication system. In a radio communication system, data is communicated upon radio channels that are formed between the sending and receiving stations of a communication system. Because radio channels are used upon which to communicate the data, a wireline connection, conventionally required in a conventional wireline communication system to interconnect the sending and receiving stations, is obviated. Communications are thereby effectuable in a radio communication system even when wireline connections cannot be formed.

Radio, as well as other, communication systems, are regularly utilized to communicate data that is subsequently processed by data processing techniques. Advancements in technologies also are applied to the processing of the data. And, communication devices, and communication systems in which the communication devices are utilized, are available by which to perform various data processing operations and communication services. Additional applications and services that implement new data processing and communication technologies shall likely increasingly become available as advancements in technologies permit.

Exemplary devices that are capable of performing both data processing and communication services include devices referred to as personal digital assistants (PDAs). Personal digital assistants are generally of small dimensions of sizes permitting their hand-carriage by a user. Personal digital assistants provide for the storage and processing of data. Databases are stored at the personal digital assistants and the data stored at the databases is selectably retrievable for viewing by the user of the device. And, processing of the data in selected manners is also sometimes permitted. Typically, the data is formatted into a series of data records in which each data record contains one or more data fields. When the device is operated by the user, the user is able selectably to retrieve the data records, or portions thereof. Processing operations performable at the device upon the data, or data fields thereof, include, for instance, sorting operations. And, the user typically is permitted to change, add to, or otherwise alter the data stored at the databases of the device.

The data stored at the device is sometimes also backed-up at another storage device. In the event of loss of the data at the device, a copy of the data is retrievable from the location at which the data is backed-up. Some conventional personal digital assistants have their databases backed-up at a personal computer or other computing station. The backup procedure is usually carried out by interconnecting the device and the computing station together by way of a fixed cable to permit the data to be backed-up. The data stored at either the device or the backed-up location is updatable, i.e., changeable, in an asynchronous manner.

However, by permitting asynchronous changes to the database copies, that is, the database and its backed-up copy, the databases no longer remain true copies of one another. Any addition, deletion, or other change of any data portion causes the data stored at one of the database copies no longer to be in complete conformity with the other of the database copies.

Synchronization operations are performed to place the database copies back into complete conformity with one another. When synchronization operations are performed, the data stored at the respective copies are compared, e.g., on a data record-by-data record or data field-by-data field basis. If the corresponding data at the separate database copies are determined to be out-of-match with one another, the data is caused to be placed back into complete match with one another. When the database copies are connected by way of a radio air interface rather than by way of a wireline connection, data synchronization operations become more problematical than when the same operations are performed when the databases are interconnected by way of a wireline connection. Bandwidth constraints are typically more restrictive in radio communication systems due to limited bandwidth allocations of bandwidth capacities in such systems.

Due to limited bandwidth availability in a radio communication system, a device at which a database copy is maintained might be unable to be used pursuant to other applications when a synchronization operation is being performed to synchronize the database copy with a remotely-stored database copy. And, when the databases are large, the synchronization procedure is lengthy, particularly when the bandwidth available on the radio air interface to perform the synchronization operations is limited.

If a manner could be provided by which a user of the device could control when the synchronization operations are performed, improved use of the device would be possible.

It is in light of this background information related to the synchronization of data of databases by way of a radio air interface that the significant improvements of the present invention have evolved.

SUMMARY OF THE INVENTION

The present invention, accordingly, advantageously provides apparatus, and an associated method, by which to facilitate data synchronization operations to synchronize database copies maintained at separate parts of a radio communication system.

Through operation of an embodiment of the present invention, a manner is provided by which selectably to control when the synchronization operations are performed. Selection is made, for instance, so that the performance of the synchronization operations do not interfere with the performance at the mobile node of other applications. And, selection is further selectably made to perform the synchronization operations during periods that exhibit lessened levels of communication activity on the radio air interface, such as during middle-of-the-night time periods.

A user of the mobile node at which a database copy is maintained selectably delays performance of the synchronization operations for a selected delay period through actuation of a user actuator. If the user selects to delay the performance of the synchronization operations by appropriately actuating the actuator, further selection is made of the delay period. Selection of the delay period is made, for instance, automatically, or through further user actuation of an actuator to select the delay period.

When the user elects to have the device perform an application, i.e., an application other than the synchronization operations, the user is able to select, preemptively, a delay in the synchronization operations. That is to say, prior to the initiation of synchronization operations, the user selects to delay performance of any subsequent synchronization operations that would otherwise be initiated and performed.

The actuator is also selectably actuable by the user when a determination is made that synchronization operations are needed. The user is, for instance, alerted to the determination that the synchronization operations are needed, and the user is prompted to actuate the actuator in the event that the synchronization operations are to be delayed. If the actuator is actuated by the user within an appropriate time subsequent to prompting of the user, the synchronization operations are delayed for a selected time period. The selected time period is further selectable, either automatically or responsive to further user actuation of an actuator. Thereby, also, the delay of the synchronization operations prevents the possibility that concurrent performance of the synchronization operations together with performance of another application shall interfere with optimal performance of the other application.

The user also, in one implementation, is able to terminate the performance of the synchronization operations, subsequent to their start. For instance, during performance of the synchronization operations, the user of the mobile node might decide to have the mobile node perform another application. Concurrent performance of both the synchronization operations and operations of the other application might noticeably appear to the user of the mobile node to slow down performance of the other application. By permitting the user of the mobile node to select to delay performance of the synchronization operations, performances of the synchronization operations are terminated, thereby to permit operation of the other application without interference. The synchronization operations are re-started, or otherwise performed, at a later time, delayed by a selected time period.

In another aspect of the present invention, a user display is provided at the mobile node that displays indicia in human perceptible form. The display displays, for instance, a first indication to indicate determination that the synchronization operations are needed to be performed. And, the display displayed upon the user display forms at least part of the prompt to prompt the user of the mobile node to select whether to delay performance of the synchronization operations.

In another aspect of the present invention, selection of the selected time period for which the performance of the synchronization operations is to be delayed is selected to be of a fixed delay length. That is to say, in one implementation, selection of the delay period is a delay period of a time length that commences upon user actuation of the actuator, upon determination of the need to perform synchronization operations, or other starting indicia. In another implementation, the selected delay period defines a time period whose end is within a window of time. For instance, the selected time period during which the synchronization operations are delayed is selected to cause the synchronization operations to commence at a certain time or within a certain window of time. The length of the time period of the delay, in this implementation, is dependent upon the commencement of the time period. For instance, synchronization operations, in one implementation, when delayed, are delayed until a late-night hour during which usage of a radio communication system in which the mobile node is operable exhibits lessened levels of loading. The length of the time period is dependent upon when the selection is made to delay the synchronization operations.

Thereby, by providing the user of the mobile node with the capability of selecting delay of the performance of the synchronization operations, the user is able to cause another application to be performed at the mobile node in optimal manner. Delay of the synchronization operations is further selectably made to cause the synchronization operations to be performed during periods during which the radio communication system in which the mobile node is operable exhibits lessened levels of usage. Selection is thereby made not only to perform the synchronization operations at times when the performance would not interfere with performance of other applications at the mobile node, but at times during which loading conditions in the radio communication systems permit optimal performance of the synchronization operations.

In these and other aspects, therefore, apparatus, and an associated method, is provided for a radio communication system. The radio communication system has a network part at which a network-copy database is maintained and a mobile node at which a mobile-copy database is maintained. User control of performance of synchronization operations by which to synchronize values of the network-copy database and the mobile-copy database are facilitated. A user actuator is embodied at the mobile node. The user actuator is selectably actuable by the user to select at least delay in the performance of the synchronization operations. A delay selector is adapted at least to receive indications of actuation of the user actuator by the user. The delay selector is at least selectably operable responsive to at least the indications of actuation of the user actuator, to select at least a selected delay period by which to delay the performance of the synchronization operations.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
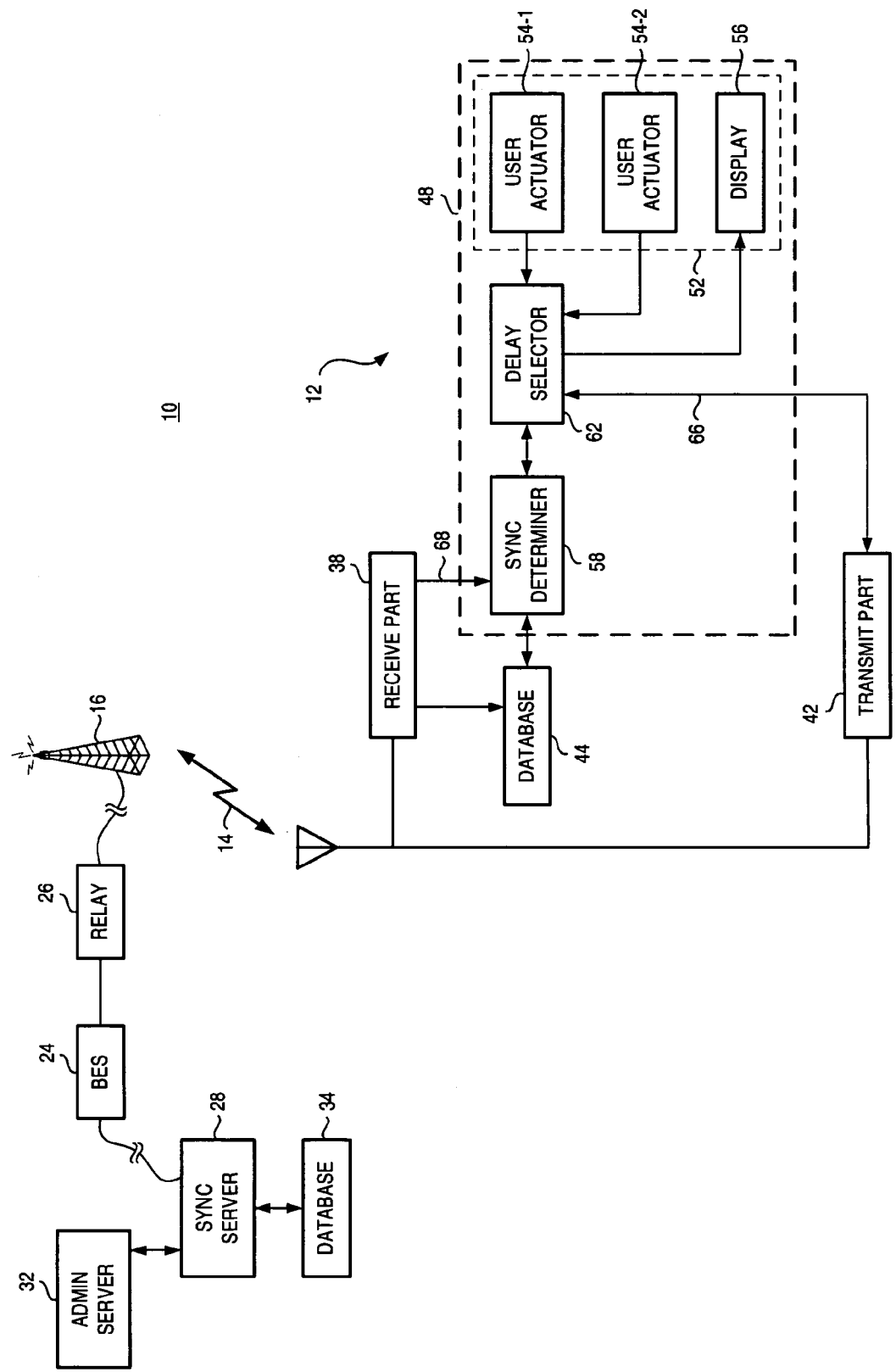
FIG. 1 illustrates a functional block diagram of a radio communication system in which an embodiment of the present invention is operable.

Referring first to FIG. 1, a radio communication system, shown generally at 10, provides for the communication node 12 and a network part of the communication system. Data is communicated during operation of the communication system by way of radio channels, here represented by the arrow 14, defined upon a radio air interface extending between the mobile node and the network part.

The communication system 10 is representative of any of various types of radio communication systems, including, for instance, a trunked-radio system, a cellular communication system, or other type of radio communication system in which communications are effectuable by way of radio channels. And, in the exemplary implementation, the radio communication system forms a multi-user communication system. While only a single mobile node is shown in the figure, other mobile nodes can analogously be represented to be operable therein.

Data is selectably communicated during operation of the communication system to, and from, the mobile node by way of the radio channels 14. Data originated at the mobile node is communicated upon radio uplink, or reverse link, channels. And, data to be sent by the network part of the communication system to the mobile node is communicated upon radio downlink, or forward link, channels to the mobile node.

In the exemplary implementation, the network part includes a base transceiver station (BTS) 16. In an actual communication system, a plurality of base transceiver stations are typically positioned at spaced-apart locations throughout an area that is to be encompassed by the communication system. A single base transceiver station 16 is shown for purposes of explanation. The base station 16 defines a coverage area, referred to herein as a cell. When the mobile node is positioned within the cell, or is otherwise within the coverage area of the base transceiver station, the mobile node is generally capable of communicating with the base transceiver station in whose coverage area that the mobile node is positioned. Due to the mobility of the mobile node, the mobile node is positionable, at different times, at coverage areas of different base transceiver stations.

The network part of the communication system also includes a relay element 26 positioned between the base transceiver station and a data sewer 24, here a Blackberry™ enterprise sewer (BES). The data sewer 24, in turn, is coupled to a synchronization sewer 28. And, an administration (admin) sewer 32 is also coupled to the synchronization sewer. The administration server provides, e.g., administrative services to the communication system. The administration services include, for instance, administrative control by which to control operation of the synchronization sewer.

The synchronization server is functionally coupled to network-based databases of which the database 34 is representative. The database 34 is representative, e.g., of a Lotus™ Notes database, a Microsoft™ exchange connector database, or other appropriate database. The contents of the database are selectably retrievable. And, in the exemplary implementation, the database is formatted to be formed of a plurality of data records, each formed of one or more data fields. The data stored at the database 34 is formatted, e.g., according to a text format, such as an extensible mark-up language (XML). XML-formatted text selectably populates selected data fields of the data records forming the database search.

The mobile node includes transceiver circuitry, here represented to be formed of a receive part 38 and a transmit part 42. The mobile node also contains a storage entity at which a database 44 is maintained. The database 44 corresponds to the database 34 embodied at the network part of the communication system. The databases 34 and 44 are copies of one another, i.e., the databases 34 and 44 form database copies of one another. As mentioned previously, however, asynchronous changes to one or the other of the database copies are possible. In the event of such an asynchronous change, the database copies no longer remain in complete match with one another and synchronization operations are performed to place the database copies back in complete match with one another. Pursuant to a synchronization operation, data dissimilarities are determined, and correction is made for the dissimilarities. However, particularly when the databases are relatively large, the synchronization operations are time-consuming and are consumptive of radio resources. Additionally, the performance of the synchronization operations might interfere, such as noticeably slowing down, performance of other applications, if concurrently performed, at the mobile node.

The mobile node, accordingly, includes apparatus, shown generally at 48, of an embodiment of the present invention that facilitates operation of the mobile node by selectably permitting a user of the mobile node to delay performance of the synchronization operations. By delaying the synchronization operations, interference of performance of user-selected applications is less likely to occur as the synchronization operations are delayed for a selected delay.

The apparatus 48 includes a user interface 52, here including user actuators 54 and a user output and display 56. The user actuators 54 are, for instance, actuation keys of a user actuator keypad that forms a portion of a conventional mobile node. And, the user display of the user output and display forms, for instance, an otherwise-conventional display element of the mobile node.

The apparatus further includes a synchronization (SYNC) determiner 58 and a delay selector 62. The determiner and selector form functional entities implementable in any desired manner, such as by algorithms executable by processing devices.

Here, the synchronization determiner 58 is coupled to the database 44 and to the receive part 38. And, the delay selector is coupled to the synchronization determiner and to the user actuators 54, here user actuators 54-1 and 54-2.

The user actuator 54-1 forms an actuator actuable by the user of the mobile node to select delay of the performance of synchronization operations. In one implementation, the actuator is actuable by the user at any time, i.e., prior to determination that synchronization operations are needed, subsequent to determination that synchronization operations are needed, but prior to their commencement, and subsequent to commencement of the synchronization operations.

Indication of actuation of the actuator is provided to the delay selector. The delay selector is operable to select the amount of delay by which the synchronization operations are to be delayed and to generate an indication of the selected delay on the line 66 for return to the network part of the communication system. The amount of delay selected by the selector is selected in any of various manners. Actuation of the user actuator 54-2 by the user provides user-selected delay periods, indications of which are provided to the delay selector. Alternately, the delay is selected automatically by the selector.

The synchronization determiner operates to determine that synchronization operations are needed. If the need for synchronization operations is first detected at the network part and communicated to the mobile node, such indications are provided to the synchronization determiner by way of the receive part 38 on the line 68. The determiner also operates to make determinations that the synchronization operations are needed by comparing contents of the database 44 together with its copy 34 responsive to indications sent to the mobile node. Indications of determinations made by the synchronization determiner are provided to the user display to be displayed thereat. In one implementation, the user is prompted to select delay of the performance of the synchronization operations responsive to the display made upon the display 56.

By permitting the user of the mobile node to select that the synchronization operations be delayed, the user is able to preclude the possibility that performance of the synchronization operations together with a user-selected application slows down the performance of the user-selected application.

Figure 2:
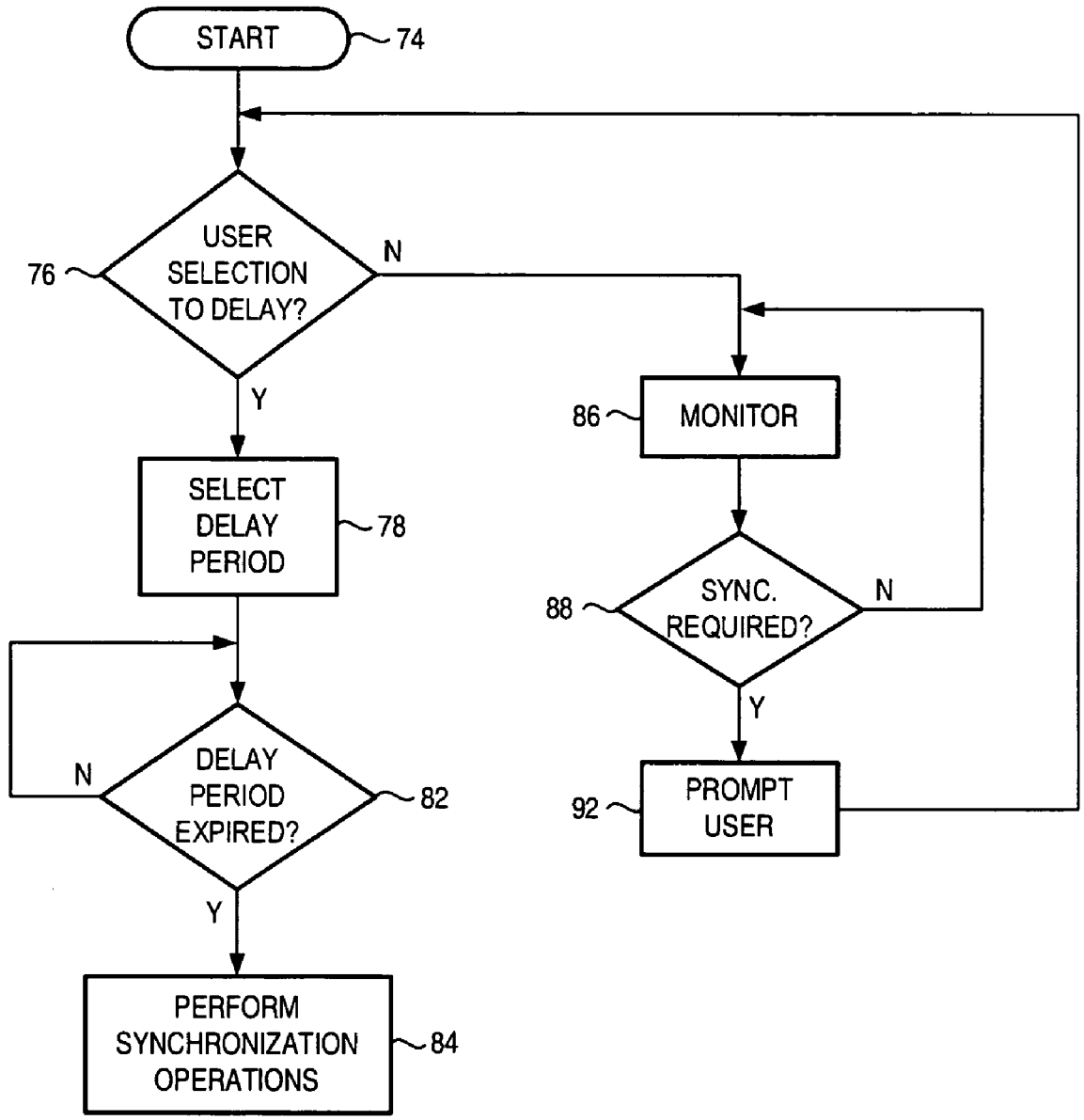
FIG. 2 illustrates a flow diagram representative of operation of an embodiment of the present invention.

FIG. 2 illustrates a flow diagram, shown generally at 72, representative of exemplary operation of an embodiment of the present invention. Operation of the method described with respect to the flow diagram 72 is carried out, at least in part, at a mobile node, such as the mobile node 12 shown in FIG. 1.

First, after entry indicated by the start block 74, a determination is made, as indicated by the decision block 76, as to whether a user has selected to delay synchronization operations. If so, the yes branch is taken to the block 78, and a delay. Then, as indicated by the decision block 82, a determination is made as to whether the delay period has expired. If not, the no branch is taken back to the decision block. Otherwise, the yes branch is taken to the block 84, and the synchronization operations are performed.

If, at the decision block 76, a determination is made that the user has not selected delay of the synchronization operations, the no branch is taken to the block 86, and the status of the synchronization is monitored. And, determinations are made, as indicated by the decision block 88, as to whether synchronization is required. If not, a no branch is taken back to the block 86. Otherwise, the yes branch is taken to the block 92 and the user is prompted to select, if desired, delay of the performance of the synchronization operations.

Figure 3:
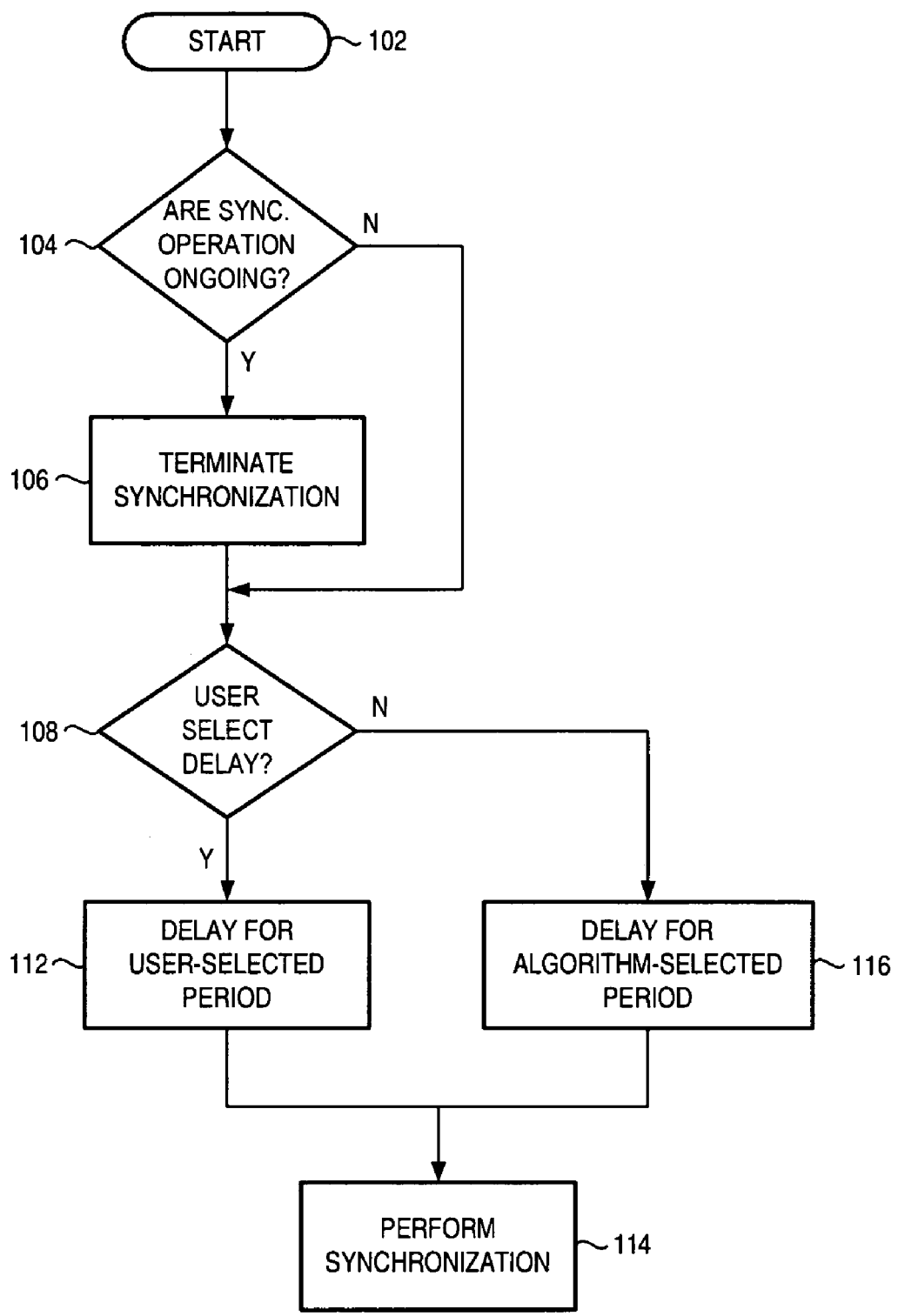
FIG. 3 illustrates a flow diagram, also representative of operation of an embodiment of the present invention.

FIG. 3 illustrates a flow control diagram, shown generally at 78, that is representative of operations by which to select the delay period by which synchronization operations are delayed in the process shown in FIG. 2.

First, after start, indicated by the start block 102, a determination is made at the decision block 104 as to whether synchronization operations are ongoing. If so, the yes branch is taken to the block 106, and the synchronization operations are terminated. Then, and as indicated by the decision block 108, a determination is made as to whether the length of the delay is user-selected. If so, the yes branch is taken to the block 112, and the synchronization operations are delayed for the period that is user-selected. And, upon expiration of the delay period, and as indicated by the block 114, the synchronization operations are performed. Otherwise, if the user has not selected the delay period, the no branch is taken from the decision block 108 to the block 116, and a delay period is selected responsive to execution of a delay algorithm. The delay algorithm, for instance, operates to delay the performance of the synchronization operations to be within a window of time of lowered system usage, such as during late evening and very early morning hours.

If, conversely, a determination is made at the decision block 104, that the synchronization operations are not ongoing, the no branch is taken therefrom to the decision block 108.

The delay period is selected either to be a user-selected delay or a delay calculated by an appropriate delay algorithm. The delay algorithm, in another embodiment, merely sets a set delay time and, in another embodiment, as noted previously, the delay period is selected to cause the synchronization operations to commence at a selected time-of-day or within a window of time periods.

Figure 4:
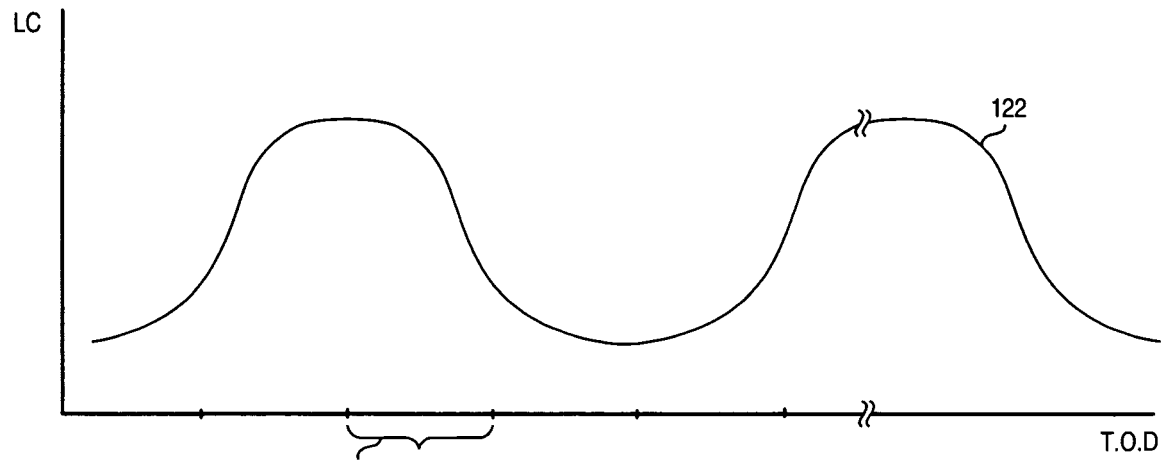
FIG. 4 illustrates graphical representations of exemplary system usage levels plotted as a function of time-of-day and the delay periods selected during exemplary operation of an embodiment of the present invention.

FIG. 4 illustrates graphically an exemplary selection of a delay period, selected by taking into account the load characteristics (LC) of the communication system in which the synchronization operations are to be performed. The plot 122 is representative of exemplary loading characteristics in the communication system plotted as a function of the time-of-day. During normal working hours, the load in the communication system is relatively high and in middle-of-the-night periods, the loading in the communication system is relatively low. Pursuant to an exemplary embodiment of the present invention, when the synchronization operations are selected to be delayed, the delay is for a period, indicated by the section 124 to delay commencement of the synchronization operations until a period of low loading is exhibited by the communication system. The time-length of the time delay is dependent upon the time at which the selection is made to delay the synchronization operations while the end of the time period is of a set time. In one implementation, the end of the delay period falls within a window of time periods so that, in a multi-user system, synchronization operations do not commence by a large number of mobile nodes at the same time. Thereby, operation of an embodiment of the present invention further advantageously makes use of the time periods in a communication system that exhibits relatively low levels of loading.

Figure 5:
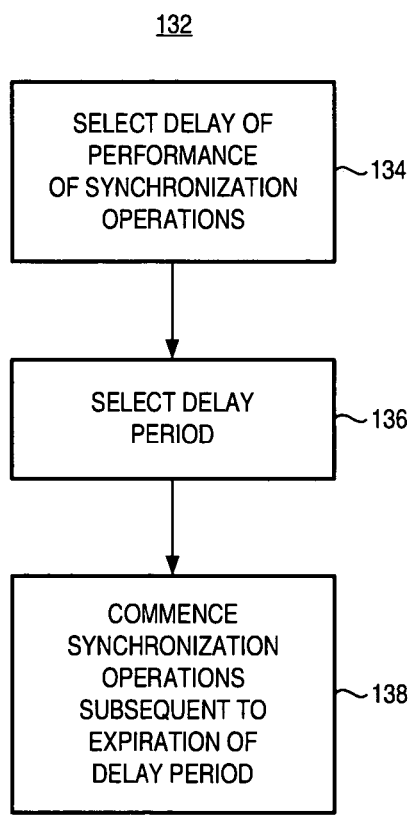
FIG. 5 illustrates a method flow diagram representative of a method of operation of an embodiment of the present invention.

FIG. 5 illustrates a method flow diagram, shown generally at 132, representative of the method of operation of an embodiment of the present invention. The method facilitates user-control of performance of synchronization operations in a radio communication network. The radio communication network has a network part at which a network-copy database is maintained and a mobile node at which a mobile-copy database is maintained. The synchronization operations are performed to synchronize values of the network-copy database and the mobile-copy database.

First, and as indicated by the block 134, selection is made, at the mobile node, to delay the performance of the synchronization operations.

Thereafter, and as indicated by the block 136, selection is made of at least a selected delay period by which to delay the performance of the synchronization operations.

Thereafter, and as indicated by the block 138, commencement of the synchronization operations is initiated subsequent expiration of the selected delay.

Thereby, a user is able selectably to delay performance of synchronization operations. And, the delay is selected such that synchronization operations are performed during a preferred time period.

The previous descriptions are of preferred examples for implementing the invention, and the scope of the invention should not necessarily be limited by this description. The scope of the present invention is defined by the following claims.

What is claimed is:

1. An apparatus for a radio communication system having a network part at which a network-copy database is maintained and a mobile node at which a mobile-copy database is maintained, said apparatus for facilitating user-control of performance of synchronization operations by which to synchronize values of the network-copy database and the mobile-copy database, said apparatus comprising:
   a synchronization determiner embodied at the mobile node to determine that synchronization operations are needed;
   a user actuator embodied at the mobile node, said user actuator selectably actuable by the user to select at least delay in the performance of the synchronization operations;
   a mobile-node display coupled to receive indications of determinations made by said synchronization determiner and operable to prompt the user to actuate said actuator in the event that synchronization operations are to be delayed; and
   a delay selector adapted at least to receive indications of actuation of said user actuator by the user, said delay selector at least selectably operable, responsive to at least the indications of actuation of said user actuator, to select at least a selected delay period by which to delay the performance of the synchronization operations, permitting commencement of the synchronization operations only subsequent to operation of the selected delay period.

2. The apparatus of claim 1 wherein the synchronization operations are performed responsive to detection of dissimilarity between values of the network-copy database and the mobile-copy database and wherein said user actuator is activated by the user prior to the detection of dissimilarity between the values of the network-copy database and the mobile-copy database.

3. The apparatus of claim 2 wherein the selected delay period, selection of which is made by said delay selector, becomes effective upon subsequent detection of the dissimilarity of values of the network-copy database and the mobile-copy database.

4. The apparatus of claim 1 wherein the synchronization operations are performed responsive to detection of dissimilarity between values of the network-copy database and the mobile-copy database and wherein said user actuator is actuated by the user subsequent to the detection of the dissimilarity and prior to commencement of the synchronization operations.

5. The apparatus of claim 4 wherein the selected delay period, selection of which is made by said delay selector, becomes effective within at least a selected time subsequent to selection thereof.

6. The apparatus of claim 5 further wherein the display embodied at the mobile node is selectably operable for displaying a first indication to indicate the detection of the dissimilarity between the values of the network-copy database and the mobile-copy database.

7. The apparatus of claim 1 wherein the synchronization operations are performed responsive to detection of dissimilarity between values of the network-copy database and the mobile-copy database and wherein said user actuator is actuated by the user subsequent to the detection of the dissimilarity and subsequent to commencement of the synchronization operations.

8. The apparatus of claim 7 wherein the selected delay period, selection of which is made by said delay selector, becomes effective within at least a selected time subsequent to selection thereof the selection further initiating at least suspension of the synchronization operations.

9. The apparatus of claim 1 wherein the display embodied at the mobile node is selectably operable for displaying a first indication to indicate the detection of the dissimilarity between the values of the network database and the mobile-copy database.

10. The apparatus of claim 1 wherein the at least the selected delay period selected by said delay selector is selected responsive to a user selection of the amount of delay.

11. The apparatus of claim 10 wherein said user actuator is further selectably actuable by the user to select the selected delay period.

12. The apparatus of claim 1 wherein the selected delay period selected by said delay selector comprises a selected time period having a selected time-period start.

13. The apparatus of claim 1 wherein the selected delay period selected by said delay selector comprises a selected time period having a selected time-period end.

14. The apparatus of claim 13 wherein the selected time-period end is defined in terms of a time-of-day indication.

15. The apparatus of claim 1 further comprising a synchronization-operation commencement initiator adapted to receive indications of the selected delay period selected by said delay selector, said synchronization-operation commencement initiator for initiating commencement of the synchronization operations subsequent to conclusion of the select delay period.

16. A method for facilitating user-control of performance of synchronization operations in a radio communication network having a network part at which a network-copy database is maintained and a mobile node at which a mobile-copy database is maintained, the synchronization operations performed to synchronize values of the network-copy database and the mobile-copy database, said method comprising the operations of:
   prompting a user to delay synchronization operations;
   enabling a user to terminate the performance of synchronization operations, subsequent to the start of said synchronization operations;
   selecting, at the mobile node, to delay the performance of the synchronization operations;
   thereafter selecting at least a selected delay period by which to delay the performance of the synchronization operations; and initiating commencement of the synchronization operations subsequent to operation of the selected delay period.

17. The method of claim 16 wherein the mobile node is further selectably operable to perform non-synchronization operations and wherein selection is made during said operation of selecting to delay the performance when the mobile node is to be operated to perform the non-synchronization operations.

18. The method of claim 16 wherein the radio communication network comprises a multi-user communication system that exhibits variable usage rates that vary, at least in part, responsive to a time-of-day indication and wherein the selected delay period selected during said operation of thereafter selecting is selected responsive to anticipation of usage rates.

* * * * *